Sept. 22, 1964   L. M. FRIEDMANN   3,150,318
ELECTRICAL INDICATING DEVICE INCLUDING A CYLINDRICAL
HOUSING WITH INWARDLY CURVED END WALLS SERVING
AS BEARING SUPPORTS
Filed Dec. 21, 1962

INVENTOR.
Louis M. Friedmann
BY
Karl F. Ross
AGENT

United States Patent Office 3,150,318
Patented Sept. 22, 1964

3,150,318
ELECTRICAL INDICATING DEVICE INCLUDING A CYLINDRICAL HOUSING WITH INWARDLY CURVED END WALLS SERVING AS BEARING SUPPORTS
Louis M. Friedmann, 314 W. 100th St., New York, N.Y.
Filed Dec. 21, 1962, Ser. No. 246,448
6 Claims. (Cl. 324—156)

My present invention relates to an indicating device responsive to the magnitude of an electrical variable (voltage or current) produced by a sensitive instrument such as, for example, an ionization-measuring device.

In an earlier application now abandoned, Ser. No. 851,329 filed November 6, 1959, I have disclosed an electrostatic indicator adapted to be used with an ionization-measuring instrument of the type described in U.S. Patent No. 2,741,707 to Rudolf Futterknecht. A primary requirement of such indicator is its ability to withstand impacts and to be usable in a variety of different positions. The general object of my instant invention is to provide an improved indicator satisfying these requirements.

In accordance with this invention I provide a substantially closed indicator housing, preferably one that is hermetically sealed to prevent the intrusion of moisture, containing electrodes, electromagnets or other means known per se for producing a field force in response to the electrical variable to be measured. Coaxially disposed in the generally cylindrical housing is a rotatable disk whose shaft is supported by bearings on opposite end walls of the housing. These end walls, or at least one of them, are inwardly curved so as to be resiliently yieldable to outward axial pressure from the shaft which is biased by a conventional restoring spring or the like to counteract the torque exerted upon the disk by the aforementioned field force. Thus, any axially directed shock experienced by the disk will be elastically absorbed by the curved end wall which, advantageously, is under stress from a surrounding elastic ring whereby its convex inner face is urged further inward against the shaft.

Another feature of my invention, designed to help stabilize the disk against impact or vibration, resides in the provision of guide means in the housing forming a pair of annular surfaces of low frictional coefficient which closely approach the opposite disk faces along a narrow peripheral zone thereof and which preferably are coated with an antifriction agent such as Teflon (polytetrafluoroethylene).

As mentioned in my abandoned application referred to above, one of the end walls of the housing may be overlain by a magnifying lens preferably of plastic material (e.g. a polyacrylate). This lens may be supplemented or replaced by a lens constituted by the curved end wall itself which may be given a finite optical refractivity of positive or negative sign.

The above and other objects, features and advantages will become more fully apparent from the following detailed description, reference being made to the accompanying drawing in which.

Figure 1:
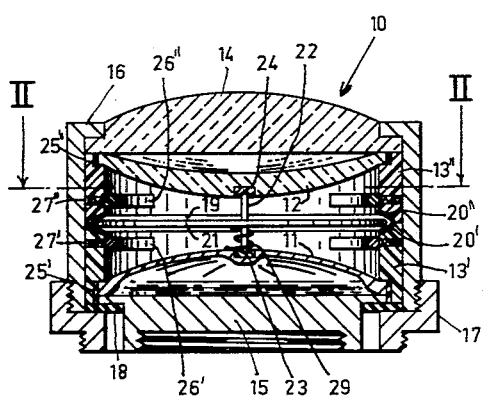
FIG. 1 is an axial sectional view of an indicating device embodying my invention.
Figure 2:
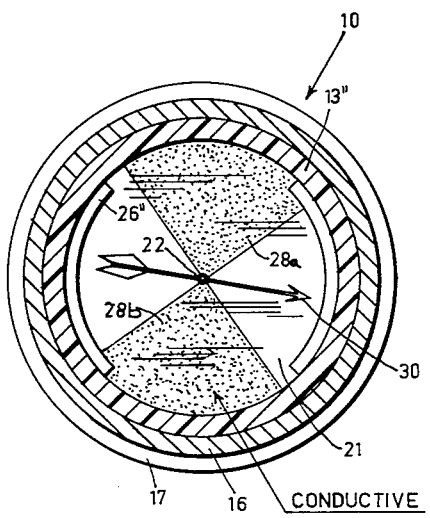
FIG. 2 is a cross-sectional veiw taken on line II—II of FIG. 1.

The indicating device 10 shown in FIGS. 1 and 2 comprises a housing composed of a lower end wall 11, an upper end wall 12 and a cylindrical wall consisting of two annular sections 13' and 13". Bottom wall 11 is metallic whereas the other wall elements are of insulating plastic material; wall 12, in particular, is also transparent. These elements, along with a transparent cover plate 14 of positive refractivity and a metallic connecting head 15 below bottom plate 11, are clamped together by a cup-shaped outer shell member 16 and a mating nut 17 threadedly engaging same. A shoulder of nut 17 bears upon head 15, and through it upon bottom plate 11, through the intermediary of an insulating washer 18 whereas the top of shell element 16 bears upon housing section 13" and top wall 12 through the cover plate 14.

The housing sections 13', 13" are cut back at their junction to form an annular recess 19 lined with Teflon layers 20', 20". Into this recess projects a flat disk 21, preferably of fluorescent plastic material, rigid with a shaft 22 which is journaled in bearings 23, 24 on end walls 11 and 12, respectively. These end walls are curved inwardly, i.e. toward the disk 21, and are radially stressed by surrounding rubber bands 25', 25" so as to exert axial pressure upon the shaft 22. Top wall 12 is given a non-uniform thickness so as to constitute a lens whose optical refractivity (here positive) supplements that of lens 14 to form a magnifying viewer.

The wall sections 13', 13" further support each a pair of diagonally opposite arcuate electrodes 26', 26" adjacent the upper and lower faces of disk 22, these electrodes being connected to the metallic shell 16, 17 through spring-urged contact pins 27', 27" bearing upon the inner wall of shell element 16. Nut 17 is shown externally threaded to facilitate its connection to some other conductor, not shown, carrying a signal potential to be evaluated. The metallic shaft 20 is connectable to the other terminal of the signal source through the bottom wall 11 and the externally threaded head 15. The potential developed between shaft 22 and electrodes 26', 26" acts upon conductive coatings 28a, 28b provided on two sector-shaped zones of the upper and lower faces of disk 21, thereby tending to rotate this disk against the force of a restoring spring anchored to the disk and to the housing wall 11. Spring 29 is a light-weight spiral spring which does not add materially to the inertia of the rotatable system represented by disk 21 and shaft 22. An arrow 30, painted or otherwise marked on the upper disk surface, cooperates with a scale (not shown) on one of the members 12, 14 to indicate the angular displacement of the disk from a zero position into which it is urged by the spring 29 and in which it may be arrested by a suitable stop. It will be understood that the interior of housing 11, 12, 13', 13" may serve as an ionization chamber for the measurement of the intensity of incident radiation which gradually dissipates the charge built up across electrodes 26', 26" and 28a, 28b.

The inherent resiliency of wall members 11 and 12, enhanced by the coercive action of the resilient rings 25', 25" peripherally surrounding them, causes a small but definite axial force to be exerted upon the disk shaft 22. If this force is overcome by a mechanical shock acting in the axial direction, the affected end wall 11 or 12 will yield momentarily to prevent any permanent deformation of the rotatable system. At the same time the periphery of disk 21 is held against major axial displacement by the adjoining guide surfaces of the Teflon coatings 20' and 20"; it will be understood that the proximity of these surfaces will not materially interfere with the rotation of the disk, owing to their low frictional coefficient, even if the disk should actually touch the Teflon coatings in operation.

Figure 3:
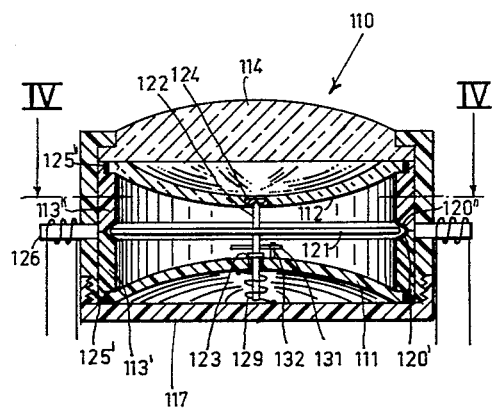
FIG. 3 is a view similar to FIG. 1, showing a modification.
Figure 4:
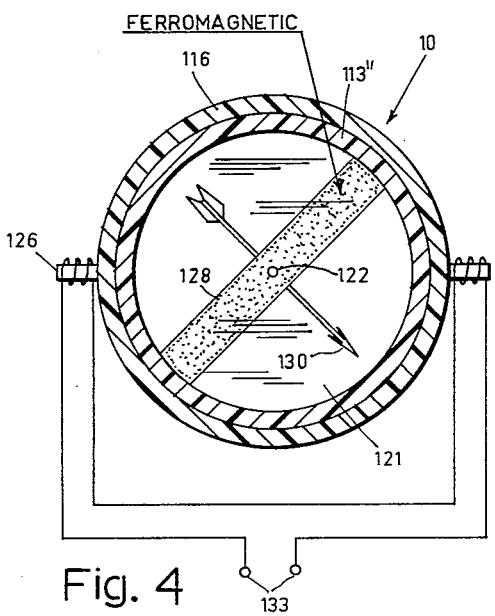
FIG. 4 is a cross-sectional view taken on line IV—IV of FIG. 3.

In FIGS. 3 and 4 I show a slightly modified indicator 110 in which the members 111, 112, 113', 113", 114 and 121–124 are generally similar to those analogously designated in the preceding embodiment. The transparent upper housing wall 112 is, however, here shown as being of negative refractivity whereas the lower housing wall 111 is made of plastic rather than metal. The electrons 26', 26" of the preceding embodiment have been replaced by a pair of electromagnets 126 lodged in an insulating outer shell element 116 which is clampingly engaged by a mating nut 117, also made of insulating material. Shaft 122 is here shown extended into the space below bottom wall 111 which also contains the restoring spring 129; a shoulder of this shaft rests in the centrally perforated bearing 123 and carries a rod 131 coacting with a stop pin 132 on bottom wall 111 to define the zero position of the disk. The faces of disk 121 are provided with a ferromagnetic coating 128, in the shape of a diagonally extending strip, whereby a torque commensurate with an applied signal current is exerted upon the disk by the electromagnets 126 when the latter are energized, in series or parallel, from a suitable source indicated in FIG. 4 by its terminals 133. The position of the disk is again ascertainable by a marking arrow 130.

Teflon coatings 120', 120" serve the same function as the coatings 20', 20" in FIG. 1. Wall members 111 and 112 are shown tensioned, as in the preceding embodiment, by rubber bands 125', 125".

If the disk 21 or 121 is made luminescent, the outline of its arrow 30 or 130 will be visible even in darkness against the markings of the reference scale overlying a portion of the disk.

It will be understood that features shown in the two embodiments may be interchanged, within the limits of compatibility, and that other modifications are possible without departing from the spirit and scope of my invention as defined in the appended claims.

I claim:

1. An indicating device for the magnitude of an electrical variable, comprising a substantially closed housing of generally cylindrical configuration, means in said housing for producing a field force in response to said variable, a rotatable disk coaxially disposed in said housing, said disk having a portion attractable by said field force whereby a torque commensurate with said force is exerted upon said disk, said disk being provided with a central shaft, bearing means in said housing supporting said shaft, said bearing means including at least one end wall of said housing of inwardly curved configuration resiliently yieldable to outward axial pressure, restoring means anchored to said disk and said housing for counteracting said field force, and guide means in said housing forming a pair of annular surfaces of low frictional coefficient closely approaching opposite faces of said disk along a narrow peripheral zone thereof.

2. A device as defined in claim 1 wherein said annular surfaces are coated with polytetrafluoroethylene.

3. An indicating device for the magnitude of an electrical variable, comprising a substantially closed housing of generally cylindrical configuration, means in said housing for producing a field force in response to said variable, a rotatable disk coaxially disposed in said housing, said disk having a portion attractable by said field force whereby a torque commensurate with said force is exerted upon said disk, said disk being provided with a central shaft, bearing means in said housing supporting said shaft, said bearing means including a pair of opposite end walls of said housing of inwardly curved configuration resiliently yieldable to outward axial pressure, resilient means bearing upon at least one of said end walls and exerting thereon an inward axial force acting upon said shaft, and restoring means anchored to said disk and said housing for counteracting said field force.

4. A device as defined in claim 3 wherein said resilient means comprises an elastic ring peripherally surrounding said one of said end walls under tension.

5. An indicating device for the magnitude of an electrical variable, comprising a substantially closed housing of generally cylindrical configuration, means in said housing for producing a field force in response to said variable, a rotatable disk coaxially disposed in said housing, said disk having a portion attractable by said field force whereby a torque commensurate with said force is exerted upon said disk, said disk being provided with a central shaft, bearing means in said housing supporting said shaft, bearing means including a pair of opposite end walls of said housing of inwardly curved configuration resiliently yieldable to outward axial pressure, restoring means anchored to said disk and said housing for counteracting said field force, and guide means in said housing forming a pair of annular surfaces of low frictional coefficient closely approaching opposite faces of said disk along a narrow peripheral zone thereof.

6. An indicating device for the magnitude of an electrical variable, comprising a substantially closed housing of generally cylindrical configuration, means in said housing for producing a field force in response to said variable, a rotatable disk coaxially disposed in said housing, said disk having a portion attractable by said field force whereby a torque commensurate with said force is exerted upon said disk, said disk being provided with a central shaft, bearing means in said housing supporting said shaft, bearing means including a pair of opposite walls of said housing of inwardly curved configuration resiliently yieldable to outward axial pressure, resilient means bearing upon at least one of said end walls and exerting thereon an inward axial force acting upon said shaft, restoring means anchored to said disk and said housing for counteracting said field force, and guide means in said housing forming a pair of annular surfaces of low frictional coefficient closely approaching opposite faces of said disk along a narrow peripheral zone thereof.

References Cited in the file of this patent

UNITED STATES PATENTS

| | | |
|---|---|---|
| 1,712,560 | Huggins | May 14, 1929 |
| 2,136,970 | Ekeberg | Nov. 15, 1938 |
| 2,587,254 | Victoreen | Feb. 26, 1952 |
| 2,823,353 | Bakke | Feb. 11, 1958 |